A. PUTNAM, Jr.
Tobacco Hook.
No. 46,940.
Patented March 21, 1865.
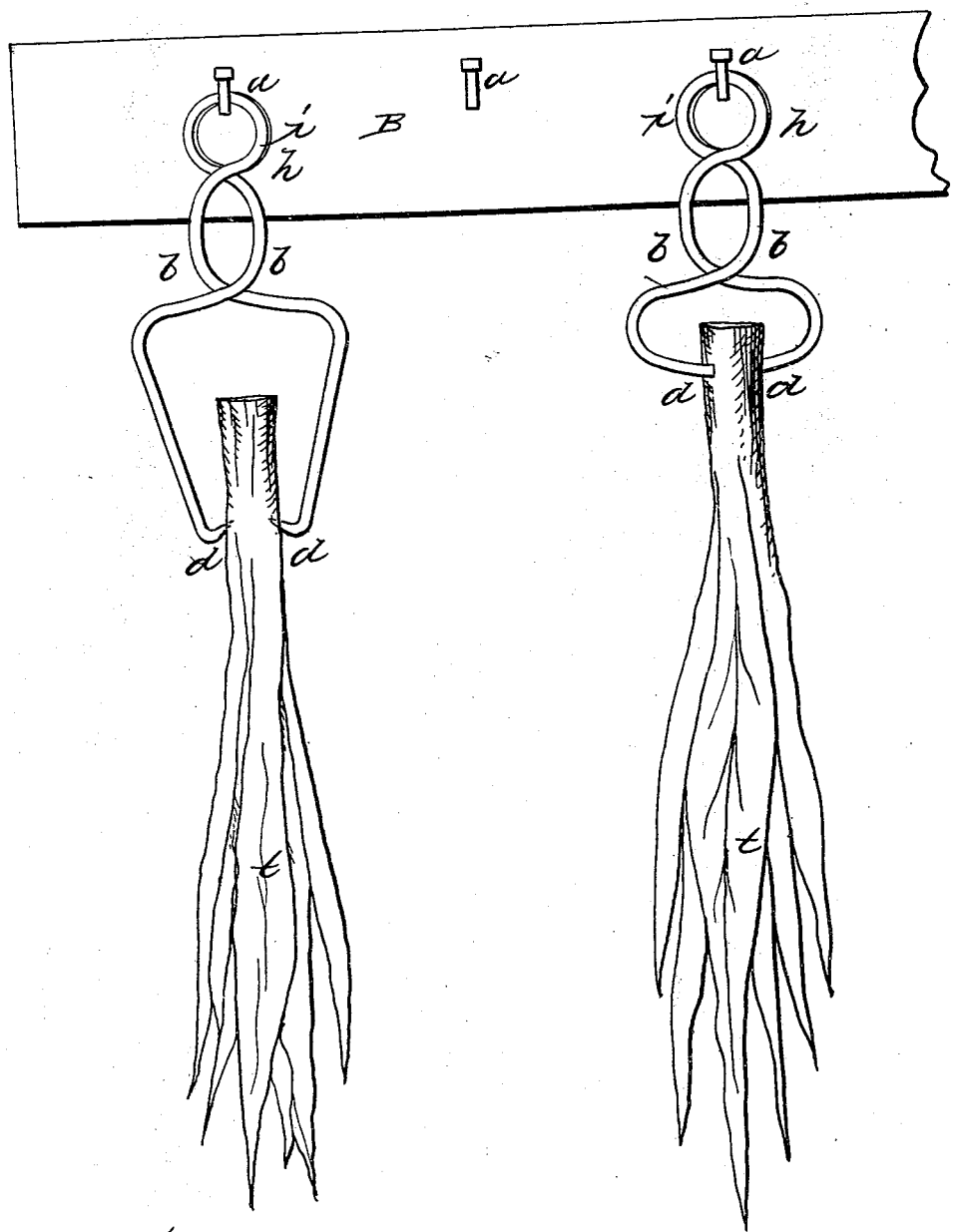
Witnesses:
Jas. P. Hall
C. L. Topliff
Inventor
A. Putnam Jr.

UNITED STATES PATENT OFFICE.

A. PUTNAM, JR., OF CHESTER, VERMONT.

TOBACCO-HOOK.

Specification forming part of Letters Patent No. 46,940, dated March 21, 1865.

*To all whom it may concern:*

Be it known that I, A. PUTNAM, Jr., of Chester, in the county of Windsor and State of Vermont, have invented a new and useful Improvement in Tobacco-Hooks; and I do hereby declare that the following is a full, clear, and exact description thereof, which will enable others skilled in the art to make and use the same, reference being had to the accompanying drawing, forming part of this specification.

The drawing, consisting of one figure, represents a beam or string-piece, B, provided with nails $a$, upon two of which are suspended hooks $h$, constructed after my invention.

The usual and common method of curing tobacco, vast quantities of which are raised in the United States, is to hang the plants in a drying-house, suspended by means of stout twine on either side of the string-pieces or drying-beams with which the drying-house is supplied, and which beams are placed at suitable distances apart to allow a free circulation of air between and around the suspended plants. The manner of suspension of the plants is as follows: One end of the twine being secured to the beam, it is then wound tightly about the head of the stalk of a tobacco-plant, which is then allowed to swing down beside and against the beam. The twine is then carried over the beam and wound several times about the stalk of another plant at such a distance from the stalk first secured as to permit the length of twine between them to extend across the beam in an angular direction. The twine is then carried back over the beam again and wound around another plant, it being intended that each plant shall lie snugly against the beam, and the effect of the angular alternations of the twine to and fro across the beam being to cause the plants on one side of the beam to hang opposite the intervals of those on the other side of the beam. (For an illustration of this common method of suspending tobacco-plants for the purpose of drying them, see page 27 of Orange Judd's Treatise on Tobacco Culture, third edition, New York, 1864.) Among the disadvantages which attend this plan of suspending tobacco-plants are the following: If one plant slips its fastening, the whole train is loosened and allowed to sag, and is in danger of falling. Another is that if any part of the work is negligently or imperfectly done the imperfection attaches to the whole train of plants on a beam. Again, it is a tedious, laborious, and slow method, and therefore expensive.

This invention consists of a tobacco-hook for suspending tobacco-plants in a drying-house, constructed with spring sides, an eye for suspending it to a nail, and prongs for seizing the stalk.

The hook, which is represented in two styles or modifications, is designated by the letter $h$. It is made of one piece of wire, whose elasticity should be sufficient for the purpose required. It is bent so as to form an eye, $i$, by which it may be suspended from any convenient point, and its sides are then bent back and formed into semicircles $b\,b$. The sides of the wire are then bent into sharp curves, and their ends $d$ are turned toward each other, as shown in the drawing. These ends $d$ are sufficiently sharpened to adapt them to penetrate or securely hold the tobacco placed between them. It is evident from this mode of construction that the elasticity of the sides of the hook bring its ends $d$ toward each other, so as to keep hold of any object placed between them, and that the ends $d$ will be forced apart and the object suspended between them released if the semicircular sides $b\,b$ are pressed toward each other.

The operation of my tobacco-hook is as follows: The hooks may be previously hung upon nails $a$, with which the drying-beams are to be provided, when the workman presses the sides $b\,b$ toward each other with a thumb and finger, thereby causing the ends $d\,d$ to separate, when he inserts between them the stalk or head of a plant. Upon releasing the sides $b\,b$, the ends $d$ close upon the stalk, and it remains suspended between them. The hooks may also be brought to the field or any receptacle where the tobacco-plants are collected and attached to them before they are suspended upon the beams of the drying-house.

I disclaim the invention claimed by Samuel Aldrich, and secured to him by Letters Patent granted September 14, 1852. My invention differs from that of S. Aldrich in having inwardly-projecting ends pointed to penetrate the stalk. Such ends would destroy the effect of Aldrich's clothes-pin, whereas to my tobacco-hook they are indispensable.

I claim as new and desire to secure by Letters Patent—

The tobacco-hook constructed as above described, as a new article of manufacture.

A. PUTNAM, JR.

Witnesses:
JAS. P. HALL,
C. L. TOPLIFF.